United States Patent [19]

Kawano et al.

[11] 4,354,877

[45] Oct. 19, 1982

[54] DEMOLITION AGENT, ITS PREPARATION AND ITS USE

[75] Inventors: Toshio Kawano, Ichihara; Shiro Ishii, Zushi; Koichi Soeda, Tokyo; Jyunichiro Migita, Yokohama, all of Japan

[73] Assignee: Onoda Cement Company, Ltd., Onoda, Japan

[21] Appl. No.: 202,786

[22] Filed: Oct. 31, 1980

[51] Int. Cl.³ .............................................. C04B 7/02
[52] U.S. Cl. .................................... 106/90; 106/97; 106/118
[58] Field of Search ............... 106/89, 90, 97, 118, 106/314, 315

[56] References Cited

U.S. PATENT DOCUMENTS

| | | | |
|---|---|---|---|
| 1,872,512 | 8/1932 | Seaton | 106/118 |
| 3,686,133 | 8/1972 | Hattori et al. | 106/314 |
| 3,801,339 | 4/1974 | Ogura et al. | 106/314 |
| 3,884,710 | 5/1975 | Allen et al. | 106/118 |

FOREIGN PATENT DOCUMENTS

| | | | |
|---|---|---|---|
| 2023695 | 5/1970 | Fed. Rep. of Germany | 106/100 |
| 2314562 | 3/1973 | Fed. Rep. of Germany | 106/100 |
| 2619790 | 5/1976 | Fed. Rep. of Germany | 106/90 |
| 1298022 | 6/1970 | United Kingdom | 106/100 |
| 1403586 | 11/1972 | United Kingdom | 106/100 |
| 1403587 | 11/1972 | United Kingdom | 106/100 |

*Primary Examiner*—James Poer
*Attorney, Agent, or Firm*—Oblon, Fisher, Spivak, McClelland & Maier

[57] ABSTRACT

A demolition agent which acts by means of expansive stress generated upon hydration and which is prepared by calcining limestone at 1300° to 1600° C. to produce a hard-burned quick lime whose crystal sizes are 10 to 100 micron, pulverizing the resulting hard-burned quick lime to 1500 to 5000 cm²/g (Blaine), mixing 5 to 70 parts by weight of a hydraulic material to 30 to 95 parts by weight of the hard-burned quick lime and furthermore adding 0.1 to 5 parts by weight of an admixture comprising a water reducing agent to 100 parts by weight of the mixture of the powdery hard-burned quick lime and the hydraulic material.

The demolition agent is used as an aqueous slurry. The slurry is filled into holes of a brittle material to demolish the brittle material by means of expansive stress generated upon hydration.

6 Claims, 2 Drawing Figures

DEMOLITION AGENT, ITS PREPARATION AND ITS USE

BACKGROUND OF THE INVENTION

This invention relates to a demolition agent for demolishing brittle materials such as rock, concrete and the like.

Various methods have been proposed wherein an aqueous slurry of an expansive material is filled into a hole drilled in the brittle materials such as rock, concrete and the like to be domolished, and demolition is achieved by means of an expansive stress of the slurry. For example, it has been considered that quick lime can be used as a demolition agent because of its great expansive stress. It has, however, the disadvantage that since quick lime on the market has a very high hydration speed and may generate heat and expand by hydration immediately after being mixed with water, its fluidity is reduced rapidly, making it difficult for pouring into the hole. Even though it can be poured, because of the lack of hydraulic property, its expansive stress may escape in the direction of the hole opening, so that its pressure against the side wall of the hole may become very low. In practice, it, therefore, can not be used as a demolition agent. In order to overcome this disadvantage, a method may be considered in which a slurry of a quick lime is poured into a hole and thereupon a binding cap is fixed at the opening of the hole to confine the escape of the expansive stress, but this is not a preferable method because of its troublesome operation.

Another method can also be considered in which silicofluoride or the like can be added to quick lime to restrict the hydration speed of the quick lime. However, it can not be expected to obtain a high expansive stress, since quick lime has no self hydraulic property and the expansive stress of quick lime may escape to the direction of the opening of the hole.

An object of this invention is to offer a hydraulic demolition agent which hydrate at a relatively low speed, to achieve large expansive coefficient and expansive stress and to demolish a brittle material by means of its expansive stress generated upon hydration.

Another object of this invention is to offer a hydraulic demolition agent which can be used at the place of atmospheric temperature higher than 5° C.

Other important objects and advantage features of this invention will be apparent from the following description and the drawings attached.

These objects can be attained in accordance with the present invention.

SUMMARY OF THE INVENTION

When limestone is calcined to produce a hard-burned quick lime whose crystal sizes are 10 to 100 microns and then the quick lime obtained in pulverized to 1500 to 5000 $cm^2/g$ (Blaine) in specific surface area, the powdery hard-burned quick lime thus obtained generates significant hydration heat after 15 minutes at the mixing ratio of 30 to 40% to water at room temperature. Since an aqueous slurry of the hard-burned quick lime lacks self hydraulic property as mentioned before, hydraulic materials such as Portland cement and admixtures such as a water reducing agent types are added to the hard-burned quick lime to overcome the disadvantage. A certain mixing ratio of the hydraulic material and the admixture to the powdery hard-burned quick lime gives big enough expansion stress to demolish the brittle materials without closing the hole by the binding cap.

DETAILED DESCRIPTION OF THE PREFERRED EMBODIMENTS OF THE INVENTION

In accordance with the present invention, there is provided a powdery demolition agent for brittle materials comprising the following main components: 30 to 95% by weight of the powdery hard-burned quick lime (1500 to 5000 $cm^2/g$ (Blaine) having 10 to 100 micron of crystal sizes which is produced by calcining limestone at 1300° to 1600° C. and 5 to 70 by weight of a hydraulic material, and 0.1 to 5% by weight of an admixture comprising a water reducing agent to 100 parts by weight of the mixture of the powdery hard-burned quick lime and the hydraulic material.

A suitable temperature and a necessary time for calcining to prepare a hard-burned quick lime in this invention depend on the type and size of kilns. As an example, 1 to 7 days are necessary to calcine at 1300° to 1600° C. in a shaft kiln. Addition of 3 to 10% by weight of $CaSO_4$, $CaF_2$, $Fe_2O_3$ or clay reduces the calcining temperature and the necessary time for calcining limestone. Calcining with the addition of the above compounds at 1200° C. for 2.5 days is equivalent to calcining without addition at 1400° C. for 2.5 days. Suitable crystal sizes in the hard-burned quick lime in the present invention is 20 to 40 micron.

Since small amount of fine powder of quick lime adhere on the surface of the powdery hard-burned quick lime and the overall hydration reaction of quick lime is promoted by the heat generated by the hydration of the fine powder of quick lime, the addition of an admixture is necessary to prevent such a hydration heat. The admixtures used in the present invention are lignin types, sulphonates of higher alcohols, oxyorganic acid types, alkylarylsulphonates types and their high condensates types, polyoxyethylene alkylethers types, polyol composite types, water-soluble melamine resine types, beta-naphthalene sulphonic acid-formaline condensate types and one or more mixture of them.

Furthermore, since the admixture increases the water reducing effect on hydraulic materials, the amount of water required to prepare an aqueous slurry with a necessary fluidity for pouring may be decreased, and the real amount of the demolition agent in unit volume of the slurry is increased. Therefore, the greater expansive stress will be generated.

Hydraulic materials used in the present invention are normal Portland cement, high early strength Portland cement, super high early strength Portland cement, ultra rapid hardening cement, alumina cement and the like. A tendency is observed that the bigger the hydraulic property of the cement is, after filling slurry of the cement in a hole the smaller the expansion stress in a given time is and the slower the propagation of crack is. This is based on the relation between the appearance of strength based on the hydraulic material and the strain caused by expansion stress from the hydration of quick lime. As the high early strength of the hydraulic material grows bigger, the self hydraulic property grows bigger, and therefore, the strain or the appearance of expansion stress becomes smaller. From the above reason, normal Portland cement is used as a hydraulic material, and so called mixed cement which is silica, fly ash, blast furnace slag or the like mixed with the Portland cement is as effective as a normal Portland cement.

According to the invention, the proper ratio of a powdery hard-burned quick lime to a hydraulic material is 30 to 95 parts by weight to 5 to 70 parts by weight. In the case that the amount of the powdery hard-burned quick lime in the mixtures is more than 95 parts by weight and that the amount of hydraulic material is less than 5 parts by weight, the demolition agent spouts from the pouring part and the expansion stress to the brittle marterial decreases, since the poured slurry accumulates heat generated by hydration. To the contrary, in the case that the amount of the powdery quick lime is less than 30% by weight and that of hydraulic material is more than 70 parts by weight, the expansive stress is not strong enough to demolish the brittle material.

In the present invention, an admixture comprising a water reducing agent is added 0.1 to 5 weight parts to the mixture of 30 to 95 parts by weight of a hard-burned quick lime and 5 to 70 parts by weight of a hydraulic material. In the case that the amount of an admixture is less than 0.1 weight part, the demolition agent may spout out from the pouring hole, especially when the temperature of the demolished material is higher than 20° C., since the heat generated by hydration of the fine powdery quick lime accelerates the hydration speed of overall quick lime and the vapour pressure in the hole increases. In the case that the addition amount of the admixture is more than 5 weight parts, the expansion speed decreases significantly.

When the demolition agent of this invention is applied to demolish the brittle materials, 30 to 50 parts by weight of water is added to 100 parts by weight of the demolition agent, and mixed to prepare an aqueous slurry, which is poured into a hole. After 16 to 20 hours, the slurry shows a bigger expansion stress than 200 kg/cm$^2$.

Figure 1:
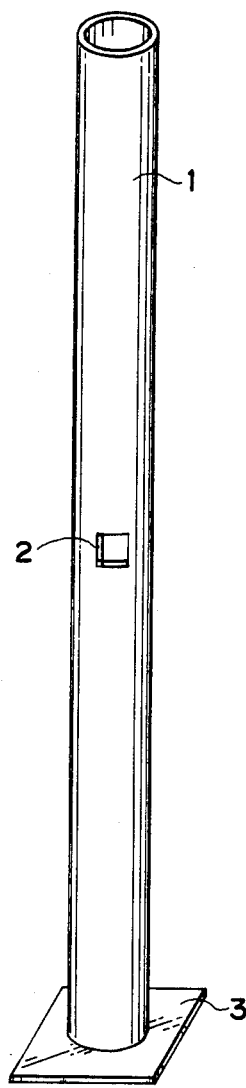
FIG. 1 shows an inclined plane of an equipment for a measuring expansion stress.

FIG. 1 comprises a carbon steel pipe 1 for ordinary piping and is arranged vertically. The pipe I has an internal diameter of 36 mm and a length of 120 cm. Two paper strain gages 2 re sticked against each other on the pipe surface of the center of the pipe length. Each paper consists of two gages with the length of 5 mm and width of 3 mm which are set in an L-shape, in order that one paper gage is horizontal and the other one is vertical. The bottom of the steel pipe is sealed to steel plate 3 by welding.

EXAMPLE 1

Limestone (CaCO$_3$ 94%) of 30 mm to 60 mm in sizes was calcined at 1350° C. for 60 hours in a shaft kiln of 7.5 m in internal diameter and 30 m in height. A hard-burned quick lime whose crystal sizes are 20 to 30 micron was prepared and pulverized to a specific surface area of 3300 cm$^2$/g (Blaine).

85 weight parts of the powdery hard-burned quick lime were mixed with 15 weight parts of normal Portland cement (made by Onoda Cement Co., Ltd.). Further the following admixture is added as shown below.

| 1. | "Mighty" powder (made by Kao Soap Co., Ltd.) (naphthalene sulphonic acid-formaline condensate types) | 0.5% by weight |
|---|---|---|
| 2. | "Melment" powder (made by Showa Denko Co., Ltd.) (water-soluble melamine resin types) | 1.0% by weight |
| 3. | "Sanflo" powder (made by Sanyo-Kokusaku Pulp Co., Ltd.) (lignin-types) | 0.5% by weight |
| 4. | "Mighty" powder (same as 1) | 1.0% by weight |
| 5. | "Sanflo" powder (same as 3) | 1.0% by weight |

An aqueous slurry prepared by adding 35 parts by weight of water to 100 parts of the demolition agent and mixing them was filled into a steel pipe as shown in FIG. 1 up to 120 cm in height at 5° C.

Figure 2:
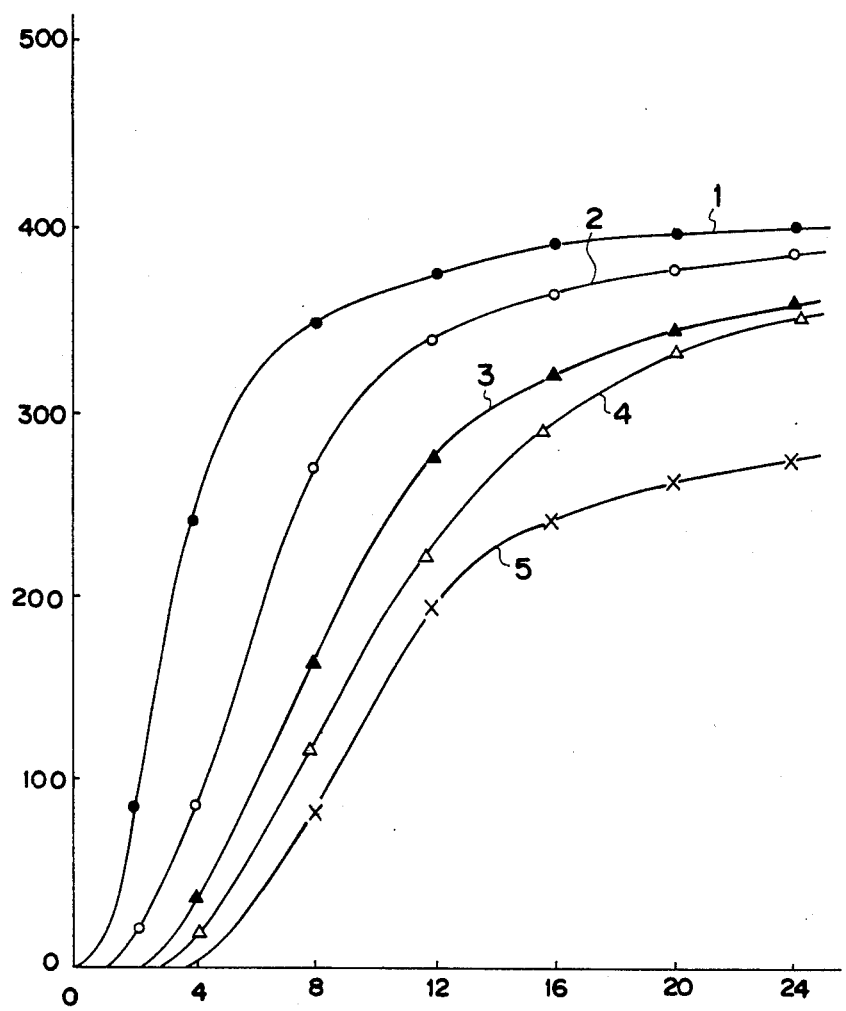
FIG. 2 shows a graph showing the relationship between an elapsed time and an expansive stress generated by slurries of the demolition agents in this invention, when the slurries of the demolition agents are filled in the expansive stress measuring device of FIG. 1.

In the FIG. 2 numerals 1, 2, 3, 4 and 5 shows a case added with 0.5% of Mighty, 1% of Melment, 0.5% of Sanflo, 1% of Mighty, and 1% of Sanflo as an admixture, respectively. The lateral axis shows elapsed times (hour) and the longitudinal axis shows expansive stresses (kg/cm$^2$).

EXAMPLE 2

A hole (40 mm in diameter and 30 cm in depth) was drilled at the middle part of a concrete cylinder (20 cm in diameter and 40 cm in height) having the mechanical properties: 410 kg/cm$^2$ of compressive strength and 38 kg/cm$^2$ of tensile strength.

A slurry obtained by mixing 80 parts by weight of the hard-burned quick lime powder which was used in Example 1, 20 parts by weight of normal Portland cement, 0.5 part by weight of Mighty as an admixture and 38 parts by weight of water was filled in the hole, and allowed to stand at the atmospheric temperature of 5° C.

Then three cracks were occurred radially from the position of the hole after 10 hours, and the concrete cylinder was split into three small blocks after 12 hours.

EXAMPLE 3

A hole (32 mm in diameter and 80 cm in depth) was drilled at the middle part of a 2 m$^3$ lump of limestone having the following mechanical properties: 900 kg/cm$^2$ of compressive strength, 60 kg/cm$^2$ of tensile strength. The same slurry as used in Example 2 was filled in the hole, and allowed to stand at the atmospheric temperature of 30° C. Then a crack with 10 mm in width was occurred after an hour and the lump of limestone was split into two blocks.

What we claim is:

1. A method of demolition of a brittle material in which one or more holes are drilled in the brittle material, and the holes are filled with an aqueous slurry of a demolition agent which acts by generating expansive stress upon hydration, characterized in that the demolition agent comprises a powdery material of 30 to 95 parts by weight of a powdery hard-burned quick lime whose crystal sizes are 10 to 100 microns, 5 to 70 parts by weight of a hydraulic material and 0.1 to 5 parts by weight of an admixture comprising a water reducing agent to 100 parts by weight of said mixture of the powdery hard-burned quick lime and the hydraulic material.

2. A method according to claim 1, wherein the crystal sizes of the hard-burned quick lime are 20 to 40 micron.

3. A method according to claim 1 or 2, wherein the hard-burned quick lime is prepared by calcining limestone at 1300° to 1600° C. for 1 to 7 days in a kiln.

4. A method according to claim 1, wherein the hydraulic material comprises at least one cement which is normal Portland cement, high early strength Portland cement, super high early strength Portland cement, ultra rapid hardening cement, or a mixed cement which is silica, fly ash, blast furnace slag, or alumina cement mixed with said Portland cement.

5. A method according to claim 4, wherein the hydraulic material comprises normal Portland cement.

6. A method according to any one of claims 1, 2 and 4, wherein the admixture comprising a water reducing agent is a lignin, a sulphonate of a higher alcohol, an oxyorganic acid, an alkylarylsulphonate and its high condensate, a polyoxyethylene alkylether, a polyol composite a water-soluble melamine resin or a beta-naphthalene sulphonic acid-formalin condensate.

* * * * *

UNITED STATES PATENT AND TRADEMARK OFFICE
CERTIFICATE OF CORRECTION

PATENT NO. : 4,354,877
DATED : October 19, 1982
INVENTOR(S) : Toshio Kawano et al It is certified that error appears in the above-identified patent and that said Letters Patent is hereby corrected as shown below:

Title page, left hand column, in between sections [22] and

[51], insert --[30] FOREIGN APPLICATION PRIORITY DATA

November 1, 1979 Japan 140501/54--.

Signed and Sealed this

Second Day of August 1983

[SEAL]

Attest:

GERALD J. MOSSINGHOFF

Attesting Officer     Commissioner of Patents and Trademarks